United States Patent Office 2,863,862
Patented Dec. 9, 1958

2,863,862
1-METHYL STEROID DERIVATIVES AND METHOD FOR THE PRODUCTION THEREOF

Carl Djerassi, Birmingham, Mich., Gilbert Stork, Leonia, N. J., and Franz Sondheimer and George Rosenkranz, Mexico City, Mexico, assignors to Syntex S. A., Mexico City, Mexico, a corporation of Mexico No Drawing. Application November 30, 1955
Serial No. 550,211

Claims priority, application Mexico December 10, 1954

14 Claims. (Cl. 260—239.55)

The present invention relates to novel cyclopentanophenanthrene derivatives and to a novel process for the preparation thereof.

More particularly the present invention relates to the novel androgenic hormone 1-methyl-19-nor-$\Delta^4$-pregnene-17$\alpha$-ol-3,20-dione (1-methyl-19-nor-17$\alpha$-hydroxy-progesterone), to a novel process for the preparation thereof and to certain novel intermediates.

The end product of the process of the present invention is a novel active hormone having valuable androgenic and anabolic properties. The product 1-methyl-19-nor-17$\alpha$-hydroxy-progesterone is also a valuable intermediate for the preparation of the active cortical hormones 1 - methyl - 19 - nor - $\Delta^4$ - pregnene - 11$\beta$,17$\alpha$,21 - triol - 3,20-dione and 1-methyl-19-nor-$\Delta^4$-pregnene-17$\alpha$,21-diol-3,11,20-trione. The first of these last-mentioned compounds can be prepared from 1-methyl-19-nor-17$\alpha$-hydroxy-progesterone by incubation of this compound with adrenal tissue under the conditions set forth in U. S. Patent No. 2,643,970 to introduce the 11$\beta$ and 21-hydroxy groups, and the second of these last two mentioned compounds can be prepared from the first one by oxidation of the 11$\beta$-hydroxy group.

In accordance with the present invention it has been discovered that the known compound 1-methyl-3-acetoxy-17$\beta$-acetyl-1,3,5(10),6,16-estrapentaene (prepared in accordance with the method of Djerassi et al., J. A. C. S. 73, 1525 (1951)), may be transformed into certain novel intermediates namely 16,17-epoxido-1-methyl-3-alkoxy-17$\beta$-acetyl - 1,3,5(10),6 - estratetraene. This last-mentioned novel type of intermediate, in accordance with the present invention, when treated further with hydrogen bromide followed by debromination, results in the preparation of the novel intermediates 1-methyl-3-alkoxy-17$\alpha$-hydroxy-17$\beta$-acetyl-1,3,5(10)-estratriene. It has been further discovered that this last-mentioned compound can be treated to form its novel ketal which when subjected to reduction with an alkali metal in liquid ammonia gives the corresponding ketal of 1-methyl-19-nor-3-alkoxy-$\Delta^{2,5(10)}$-pregnadiene-17$\alpha$-ol-20-one. This last type of compound can then be rearranged by treatment with acid to give the desired novel hormone 1-methyl-19-nor-$\Delta^4$-pregnene-17$\alpha$-ol-3,20-dione (1-methyl-19-nor-17$\alpha$-hydroxy-progesterone).

The following equation serves to outline the process of the present invention and the production of the novel compounds previously referred to:

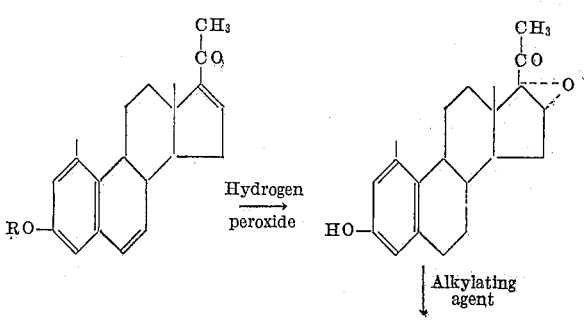

In the above equation R represents hydrogen or an acyl group of the type customarily used for the esterification of steroid alcohols. In general, these acyl groups are preferably residues of lower fatty acids or benzoic acid. R may however, in general, represent the residue of hydro carbon carboxylic acids of less than 10 carbon atoms.

In the above equation $R_1$ represents an alkyl group preferably a lower alkyl group such as methyl or ethyl.

In practicing the process above-outlined the known compound 1-methyl-3-acetoxy-17$\beta$-acetyl-1,3,5(10),6,16-estrapentaene, prepared in accordance with the method disclosed by Djerassi et al., J. A. C. S. 73, 1525 (1951), or the corresponding 3-hydroxy compound, which may be prepared therefrom by saponification, is oxidized with hydrogen peroxide and in alkaline medium. For the oxidation the starting compound is dissolved in an organic solvent such as methanol, cooled and treated with hydrogen peroxide solution and an alkali preferably an alkali metal hydroxide such as sodium hydroxide. The alkali and hydrogen peroxide are preferably added dropwise from two separatory funnels. After the solutions of hydrogen peroxide and sodium peroxide are added, the reaction solution is kept for a short period of time in the cold and thereafter kept for a substantial period at room temperature. The reaction mixture is then neutralized and the product extracted therefrom with an organic solvent such as chloroform. The chloroform solution is then evaporated to dryness and the product crystallized. The resultant product is 16,17-epoxido-1-methyl-3-hydroxy-17β-acetyl-1,3,5(10),6-estratetraene.

For the second step of the process, the 16,17-epoxido compound obtained as a result of the first step is dissolved in an organic solvent, preferably a lower alcohol such as methyl alcohol, and treated with an alkylating agent preferably an alkyl sulfate such as methyl sulfate in the presence of a strong base such as for example potassium hydroxide. After a short period of reaction the reaction solution is cooled, diluted with water and the precipitate formed collected. On recrystallization from an organic solvent there is produced the corresponding 16,17-epoxido-1-methyl-3-alkoxy-17β-acetyl-1,3,5(10),6-estratetraene compound. The ether produced in accordance with the previous step is then treated with hydrogen bromide preferably in glacial acetic acid to prepare the corresponding bromohydrin. The bromohydrin thus produced is then hydrogenated in the presence of a hydrogenation catalyst, an especially suitable catalyst being of the palladium variety as for example palladium on calcium carbonate. Preferably, hydrogenation is continued for a substantial period of time of the order of 16 hours. The catalyst is then removed and the solution evaporated to dryness. The residue after recrystallization from an organic solvent was the desired 1-methyl-3-alkoxy-17α-hydroxy-17β-acetyl-1,3,5(10)-estratriene.

The estratriene compound prepared in accordance with the previous step is then dissolved in an organic solvent such as benzene and ethylene glycol together with a catalytic amount of p-toluenesulfonic acid is added thereto. The reaction mixture was then refluxed for relatively long period of time as of the order of ten hours with continuous removal of the water formed during the reaction. The resultant compound upon purification and recrystallization was the corresponding ethylene ketal of 1-methyl-3-alkoxy-17α-hydroxy-17β-acetyl-1,3,5(10)-estratriene.

The ketal compound prepared in accordance with the previous step is then dissolved in organic solvent such as ether and added to a solution of an alkali metal such as lithium wire in anhydrous ammonia. After a short period there is added to the reaction mixture an alcohol such as ethanol and the ammonia is then allowed to evaporate at room temperature overnight. The residue is collected in cold water and extracted with an organic solvent. Crystallization from an organic solvent gave the corresponding 20-ketal of a 1-methyl-19-nor-3-alkoxy-2,5(10)-pregnadiene-17α-ol-20-one. This last compound was then treated in an acid medium, as for example, of a mineral acid such as hydrochloric acid as by heating for a short period to reconstitute the 20-keto group and rearrange ring A to give the desired final product 1-methyl-19-nor-$\Delta^4$-pregnene-17α-ol-3,20-dione.

The following specific examples serve to illustrate but are not intended to limit the present invention:

*Example I*

A solution of 3 g. of 1-methyl-3-acetoxy-17-acetyl-1,3,5(10),6,16-estrapentaene in 100 cc. of methanol, cooled in an ice bath, was treated simultaneously with 6 cc. of 30% hydrogen peroxide and a solution of 4 g. of sodium hydroxide in 15 cc. of water, which were added dropwise from two separatory funnels. The time for the addition of the two solutions was of approximately 15 minutes, and after this time the solution was kept for a further 30 minutes in the cold and then overnight at room temperature. The mixture was diluted with water, acidified, extracted with chloroform, and the chloroform solution was dried over sodium sulfate and evaporated to dryness. Crystallization from chloroform-methanol gave 16,17 - epoxido - 1 - methyl - 3 - hydroxy-17β-acetyl-1,3,5(10),6-estratetraene.

*Example II*

A boiling solution of 2.5 g. of the 16,17-epoxido, obtained in accordance with Example I, in 180 cc. of methanol was treated alternatively with four portions of 7 cc. of 50% potassium hydroxide and four portions of 7 cc. of methyl sulfate. After ten minutes the solution was cooled and diluted with water and the precipitate formed was collected, well-washed with water and crystallized from acetone-hexane, thus yielding 2.5 g. of 16,17 - epoxido - 1 - methyl - 3 - methoxy - 17β - acetyl-1,3,5(10),6-estratetraene. Melting point 138°–140° C., $[\alpha]_D$ −63° (chloroform).

*Example III*

5 cc. of a 32% solution of hydrogen bromide in glacial acetic acid was added to a solution of 2.5 g. of 16,17 - epoxido - 1 - methyl - 3 - methoxy - 17β - acetyl-1,3,5(10),6-estratetraene, obtained in accordance with Example II in 25 cc. of glacial acetic acid and the mixture was kept for 15 minutes at a temperature of 18° C. It was then diluted with much water, the precipitate of the bromohydrin was filtered, washed abundantly with water, air dried and dissolved in 65 cc. of 95% ethanol. This solution was then hydrogenated under an atmosphere of hydrogen at atmospheric pressure for 16 hours in the presence of 9 g. of a 2% palladium on calcium carbonate catalyst. The catalyst was removed by filtration and the solution was evaporated to dryness. The residue crystallized from acetone-hexane to give 2.1 g. of 1-methyl-3-methoxy-17α-hydroxy-17β-acetyl-1,3,5(10)-estratriene.

*Example IV*

A solution of 2 g. of 1-methyl-3-methoxy-17α-hydroxy-17β-acetyl-1,3,5(10)-estratriene, obtained in accordance with Example III in 40 cc. of benzene containing 4 cc. of ethylene glycol and a trace of p-toluenesulfonic acid was refluxed for ten hours with the use of an adapter for the continuous removal of the water formed during the reaction. Dilute potassium hydroxide was added and the benzene layer was washed several times with water, dried and evaporated to dryness. Crystallization of the residue from acetone-methanol yielded the ethyleneketal of 1-methyl - 3 - methoxy - 17α - hydroxy - 17β - acetyl-1,3,5(10)-estratriene. Melting point 166°–168° C., $[\alpha]_D$ +115° (chloroform).

*Example V*

1.4 g. of lithium metal (wire) was dissolved in 150 cc. of anhydrous liquid ammonia in a Dewar flask fitted with a mechanical stirrer and then a solution was added dropwise in the course of approximately 5 minutes, of 1.4 g. of the ketal obtained in accordance with Example IV in 150 cc. of anhydrous ether. After waiting for ten minutes, there was added dropwise in the course of 20 minutes 16 cc. of absolute ethanol and the ammonia was left to evaporate at room temperature overnight. The residue was collected with cold water and extracted with ethyl ether, and the extract was washed to neutral, dried and evaporated to dryness. Crystallization from hexane afforded 1 g. of the 20-ketal of 1-methyl-19-nor-3-methoxy-$\Delta^{2,5(10)}$-pregnadien-17α-ol-20-one.

*Example VI*

3 cc. of 3-normal hydrochloric acid was added to a solution of 1 g. of the 20-ketal of 1-methyl-19-nor-3-methoxy-$\Delta^{2,5(10)}$-pregnadien-17α-ol-20-one, obtained in accordance with Example V in 50 cc. of methanol and the mixture was heated for 15 minutes at 60° C. and cooled. Ether and water were added and the ether layer was washed with sodium bicarbonate solution and evaporated to dryness. Recrystallization from methanol gave 1-methyl-19-nor-$\Delta^4$-pregnen-17α-ol-3,20-dione. Melting point 220°–221° C. $[\alpha]_D$ +26° (chloroform).

We claim:
1. A process for the preparation of 1-methyl-19-nor-$\Delta^4$-pregnene-17α-ol-3,20-dione comprising oxidizing a compound selected from the class consisting of 1-methyl-3-hydroxy-17β-acetyl-1,3,5(10),6,16-estrapentaene and its

3-esters of hydrocarbon carboxylic acids of less than 10 carbon atoms with hydrogen peroxide in an alkaline medium to form the corresponding 16,17-epoxide, treating the epoxide with alkyl sulfate to form a 16,17-epoxido-1-methyl - 3- alkoxy- 17β- acetyl - 1,3,5(10),6- estratetraene, treating the 3-alkoxy derivative thus formed with hydrogen bromide to form the corresponding bromohydrin and debrominating the bromohydrin with hydrogen in the presence of a palladium catalyst to form 1-methyl-3-alkoxy-17α-hydroxy-17β-acetyl-1,3,5(10)-estratriene, reacting the last-mentioned compound with ethylene glycol to form the corresponding ethyleneketal thereof, reducing the ethyleneketal with an alkali metal of the class consisting of sodium and lithium to form the ketal of 1-methyl-19-nor-3-alkoxy-$\Delta^{2,5(10)}$- pregnadiene- 17α-ol-20-one and subjecting this last-mentioned compound to rearrangement in an acid medium.

2. A process for the preparation of the 16,17-epoxide of 1-methyl-3-hydroxy-17β-acetyl-1,3,5(10),6- estratriene which comprises oxidizing a compound selected from a class consisting of 1-methyl-3-hydroxy-17β-acetyl-1,3,5(10),6,16-estrapentaene and its 3-esters of hydrocarbon carboxylic acids of less than 10 carbon atoms with hydrogen peroxide in an alkaline medium.

3. A process for the preparation of 16,17-epoxido-1-methyl-3- alkoxy-17β- acetyl- 1,3,5(10),6 - estratetraene comprising treating the corresponding 3-hydroxy compound with alkyl sulfate.

4. The process of claim 3 wherein the alkylating agent is methyl sulfate and the resultant compound is the 3-methoxy compound.

5. A process for the preparation of a 1-methyl-3-alkoxy-17α-hydroxy-17β-acetyl-1,3,5(10)-estratriene comprising treating the corresponding 16,17-epoxido-1-methyl-3-alkoxy-17β-acetyl-1,3,5(10),6-estratetraene with hydrogen bromide to form the corresponding bromohydrin and thereafter debrominating the bromohydrin and simultaneously saturating the C-6 double bond with hydrogen in the presence of a palladium catalyst.

6. A process for the preparation of 1-methyl-19-nor-$\Delta^4$-pregnene-17α-ol-3,20-dione which comprises reacting 1- methyl- 3- alkoxy-17α- hydroxy-17β- acetyl- 1,3,5(10)-estratriene with ethylene glycol to form the corresponding 20-ethyleneketal, reducing the 20-ethyleneketal with an alkali metal selected from the class consisting of sodium and lithium in liquid ammonia to form a corresponding $\Delta^{2,5(10)}$-compound and subjecting the $\Delta^{2,5(10)}$-compound to the action of an acid to hydrolize and rearrange the $\Delta^{2,5(10)}$-compound.

7. The process of claim 6 wherein the alkali metal is lithium.

8. A new compound selected from a class consisting of 16,17- epoxido-1- methyl-3- hydroxy- 17β- acetyl-1,3,5(10),6-estratetraene and its 3-alkyl ethers.

9. 16,17- epoxido- 1- methyl - 3 - hydroxy - 17β - acetyl-1,3,5(10),6-estratetraene.

10. 16,17 - epoxido- 1- methyl - 3- alkoxy - 17β - acetyl-1,3,5(10),6-estratetraene.

11. 16,17 - epoxido - 1- methyl-3- methoxy - 17β- acetyl-1,3,5(10),6-estratetraene.

12. The 20-ethyleneketal of 1-methyl-3-alkoxy-17α-hydroxy-17β-acetyl-1,3,5,(10)-estratriene.

13. The 20-ethyleneketal of 1-methyl-3-methoxy-17α-hydroxy-17β-acetyl-1,3,5(10)-estratriene.

14. 1-methyl-19-nor-$\Delta^4$-pregnene-17α-ol-3,20-dione.

References Cited in the file of this patent

UNITED STATES PATENTS

| | | |
|---|---|---|
| 2,598,652 | Velluz et al. | May 27, 1952 |
| 2,781,365 | Djerassi | Feb. 12, 1957 |

FOREIGN PATENTS

| | | |
|---|---|---|
| 715,939 | Great Britain | Sept. 22, 1954 |

OTHER REFERENCES

Djerassi et al.: J. A. C. S., vol. 73, page 1524 (1951).